United States Patent [19]

Ditzig

[11] 4,095,089
[45] June 13, 1978

[54] SEQUENCING SWITCH ASSEMBLY

[75] Inventor: Albert F. Ditzig, Hoffman Estates, Ill.

[73] Assignee: Molex Incorporated, Lisle, Ill.

[21] Appl. No.: 733,145

[22] Filed: Oct. 18, 1976

[51] Int. Cl.² .................................... F27D 11/00
[52] U.S. Cl. ............................... 219/441; 99/280
[58] Field of Search ............... 99/280, 281, 282, 283; 219/442, 441, 483, 486, 487, 506; 337/363, 86

[56] References Cited

U.S. PATENT DOCUMENTS

| 3,254,184 | 5/1966 | Huffman et al. | 337/363 |
| 3,385,201 | 5/1968 | Martin | 99/282 |
| 3,479,949 | 11/1969 | Reynolds et al. | 99/282 |
| 3,740,231 | 6/1973 | Drwal et al. | 99/281 |
| 3,869,968 | 3/1975 | Ihlenfeld | 99/280 |

Primary Examiner—J. V. Truhe
Assistant Examiner—Fred E. Bell

[57] ABSTRACT

A push button switch assembly for use in association with a heating element which heats a liquid medium or the like. The switch assembly generally includes a housing, a first switch mounted in the housing and movable between on and off positions, and a second switch mounted in the housing movable between on and off positions. The second switch is mechanically associated with the first switch so that the second switch is movable from its off position to its on position when the first switch is moved from its off position to its on position. The first switch is also electrically connected to the heating element to turn the element on and off. The first switch is actuated by means of a manually depressable push button mounted on the housing for moving the first switch from its off to its on position. A bimetallic element is provided between the first switch and the liquid medium for moving the first switch from its on position to its off position when the liquid medium reaches a given temperature.

11 Claims, 9 Drawing Figures

SEQUENCING SWITCH ASSEMBLY

BACKGROUND OF THE INVENTION

1. Field of the Invention

The present invention generally relates to a sequencing switch assembly and, more particularly, to a switch assembly which has thermally responsive actuating means.

2. Brief Description of the Prior Art

Switch assemblies have been used to perform the function of activating a plurality of circuits in a predetermined order upon successive manual actuation of the switch assembly. Sequencing switches of this kind have also been made employing a bimetallic or thermally responsive element to change the mode of the switch from on to off as embodied in U.S. Pat. No. 3,495,203, issued Feb. 10, 1970.

One application for a sequencing switch of the type described would be in a liquid percolating apparatus, such as a coffeemaker. one example of such an apparatus is disclosed in U.S. Pat. No. 3,479,949, the contents of which are incorporated by reference herein. A coffeemaker of the automatic drip variety employs at least one heating element to heat the liquid in the form of water by percolation, then dispensing the heated water into a container outside the apparatus and then maintaining the percolated liquid at a given temperature in the container. The liquid in the outside container is usually maintained at a given temperature by means of a second heating element which has a lesser heating capacity than the first heating element. It is, therefore, necessary to provide a switch assembly to commence the percolation by activating the first and second heating elements, turn off the first heating element when the liquid has been dispensed, leaving the second heating element to keep the liquid in the container warm, and then turn off the second heating element when it is desired to deactivate the apparatus.

In the past, the above described functions were performed by more than one switch assembly. This is not only expensive, but also takes up more room than is desirable.

SUMMARY OF THE INVENTION

It is therefore the principal object of the present invention to provide a switch assembly for use in association with a heating element which heats a medium that is relatively compact and inexpensive. This and other objects of the present invention are accomplished by one currently contemplated embodiment which generally includes a housing, a first switch mounted in the housing and movable between on and off positions, and a second switch mounted in the housing movable between on and off positions. The second switch is mechanically associated with the first switch so that the second switch is movable from its off position to its on position when said switch is moved from its off position to its on position. The first switch is also electrically connected to the heating element to turn the element on and off. The switch assembly also includes manually operable actuating means mounted on the housing and associated with the first switch for moving said first switch from its off position to its on position and thermally responsive actuating means associated between the first switch and the medium for moving the first switch from its on position to its off position when the medium reaches a given temperature.

Another object of the present invention is to provide a new and improved electrical apparatus for receiving a liquid, percolating said liquid and dispensing it into a container outside the apparatus, and then maintaining said percolated liquid at a given temperature in the container. This and other objects of the invention are accomplished by one currently contemplated embodiment which generally includes a percolating chamber for receiving the liquid within the apparatus, a first heating element adjacent the container for heating liquid contained therein, a second heating element associated with the percolating chamber for percolating the liquid therein, and a switch assembly. The switch assembly includes a housing mounted on the apparatus, a first switch mounted in the housing movable between on and off positions and electrically connected to the first heating element to turn the first heating element on and off, a second switch mounted in the housing movable between on and off positions. The second switch is mechanically associated with the first switch so that the second switch is movable from its off position to its on position when the first switch is moved from its off position to its on position. The second switch is electrically connected to the second heating element to turn the second heating element on and off. The switch assembly also includes a manually operable actuating means mounted on the housing and associated with said first switch for moving said first switch between its on and off positions and a thermally responsive actuating means associated between said first switch and said first heating element for moving said first switch from its on position to its off position when the percolating chamber reaches a given temperature.

DESCRIPTION OF THE PREFERRED EMBODIMENT

Figure 1:
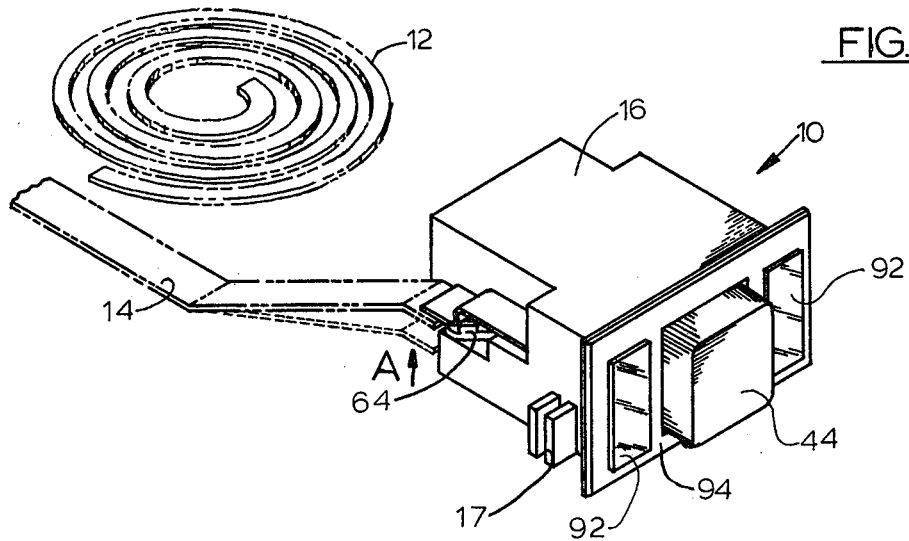
FIG. 1 is a perspective view showing the general relationship of the switch assembly of the present invention with a heating element and a bimetallic element.

Turning now to FIG. 1, the sequencing switch assembly, generally designated 10, of the present invention is illustrated in combination with a first heating element 12 and a thermally responsive bimetallic element 14. The switch assembly 10 is adapted to be mounted in the housing of a percolating apparatus (not shown in Fig. 1)

which receives a liquid such as water, percolates the liquid and dispenses it into a container (not shown) outside the apparatus, and then maintains the percolated liquid at a given temperature in the container.

The heating element 12 shown in phantom in FIG. 1, when activated, serves to heat the liquid within the apparatus to cause it to percolate. A second heating element (not shown in FIG. 1) is employed to keep the percolated liquid warm in the container.

The switch assembly 10 is used to control the sequence of modes of the percolating apparatus. To this end, the switch assembly 10 is changeable between three sequenced modes: An "off" mode wherein both heating elements are off, a "percolating" mode wherein both heating elements are on; and a "warm" mode wherein the first heating element 12 is off and the second heating element is on.

Figure 2:
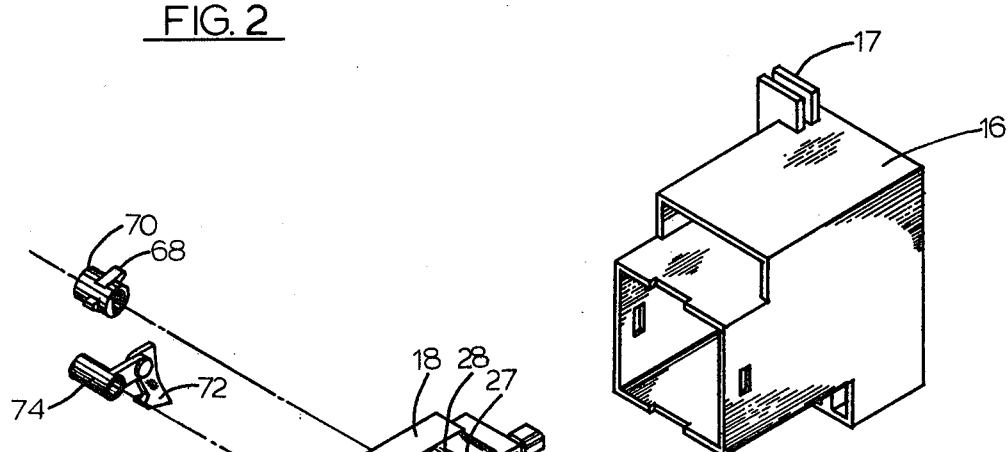
FIG. 2 is an exploded perspective view of the switch assembly of the present invention.

Turning now to FIG. 2 in greater detail, the switch assembly 10 is seen to generally include a housing 16 having mounting tabs 17 formed on the outside thereof for mounting onto the apparatus (not shown in FIG. 2). The components of the switch assembly 10 are mounted on a support member including a support member web portion 18 and a support member base portion 20. A first switch 22 is mounted on one side of the web portion 18 while a second switch, generally designated 24, is mounted on the other side of the web portion 18.

Figure 4:
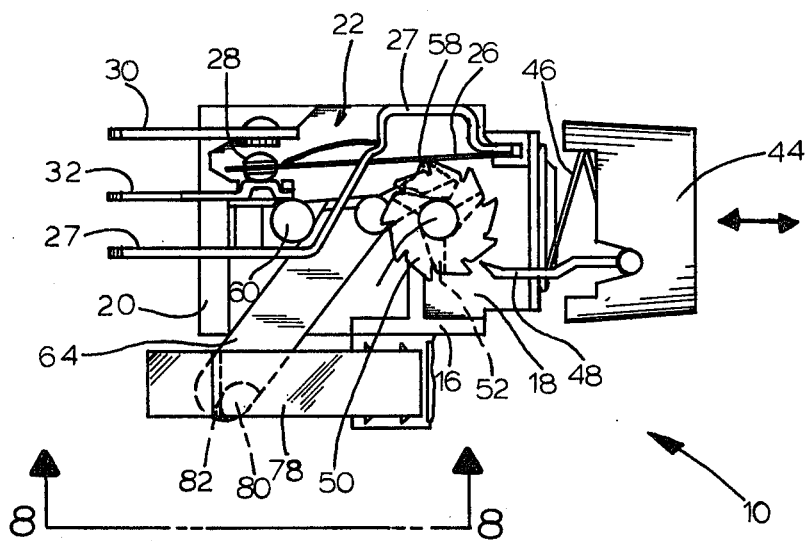
FIG. 4 is a side elevational view of the switch assembly of the present invention without its housing and showing the first switch thereof in its "off" position.
Figure 5:
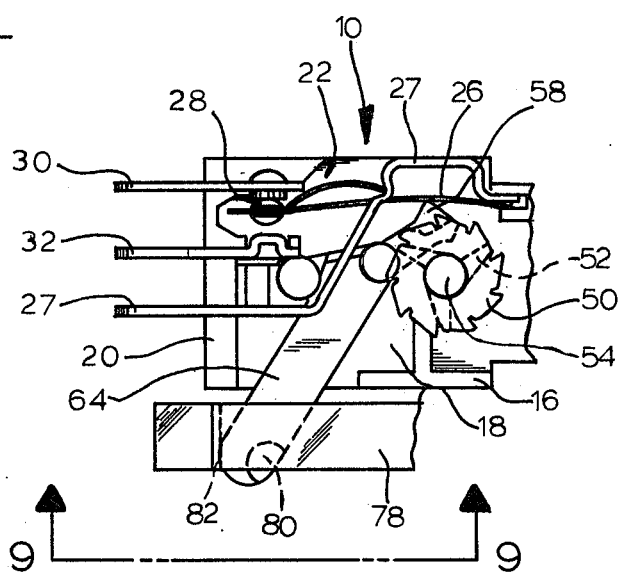
FIG. 5 is a fragmentary side elevational view showing the switch assembly of the present invention illustrating the first switch thereof in its "on" position.

The first switch 22 generally includes a switch blade 26 which is mounted between the web portion 18 and a terminal 27 which extends from the top of the web portion 18 through the base portion 20 as is best shown in FIGS. 4 and 5. The switch blade 26 has a contact portion 28 which is movable between terminals 30 and 32 mounted in the base portion 20. Terminal 30 is connected to the first heating element 12 so that when the switch blade 26 is in the position shown in FIG. 4, the heating element 12 is off while, if the switch blade 26 is in the position shown in FIG. 5, the heating element 12 is on.

Figure 6:
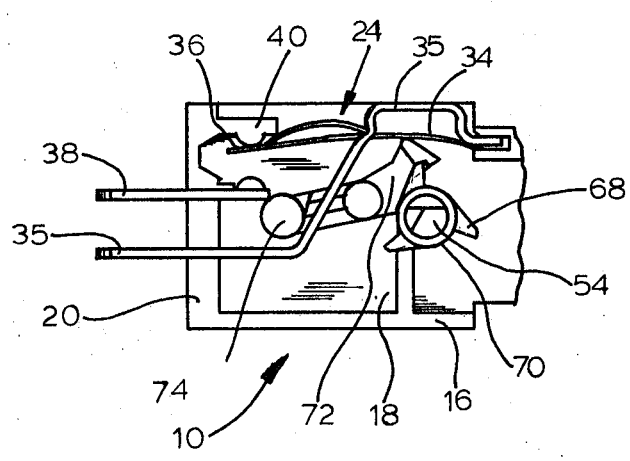
FIG. 6 is a fragmentary side elevational view of the switch assembly of the present invention illustrating the second switch thereof in its "off" position.
Figure 7:
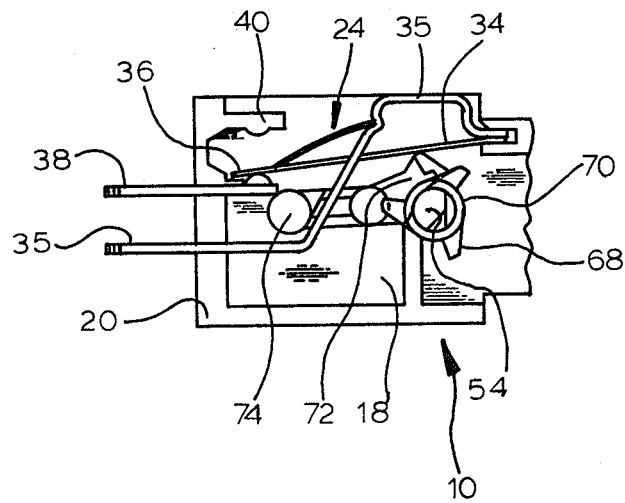
FIG. 7 is a fragmentary side elevational view of the switch assembly of the present invention illustrating the second switch thereof in its "on" position.

By looking at FIGS. 6 and 7, the second switch 24 is seen to generally include another switch blade 34 mounted between the web portion 18 and a terminal 35 extending through the base portion 20. A contact portion 36 of switch blade 34 is movable between a terminal 38 and a dummy stop 40. Terminal 38 is electrically connected to the second heating element (not shown in FIGS. 6 and 7). Thus, when switch blade 34 is in the position shown in FIG. 6, the second heating element is off while when the switch blade 34 is in the position in FIG. 7, the second heating element is on.

The switch assembly is actuated by depressing a push button 44 (FIGS. 1 and 4). Push button 44 is mounted over a coiled spring 46 (FIG. 4) which is supported on the web portion 18. In this manner, the spring 46 causes push button 44 to return to its normal position after depression.

A pawl member 48 is mounted in association with the push button 44 for movement downwardly therewith. The pawl member 48 is adapted to engage actuating means on the first switch 22 for moving the switch blade 26 between the positions shown in FIGS. 4 and 5.

The actuating means on the first switch 22 generally includes a ratchet member 50 having a cam member 52 integrally formed therewith rotatably mounted on the web portion 18 by means of a keyed shaft 54 received through an opening 56 formed in the web portion.

Associated with the cam member 52 is a first positioner member 58 which is pivotally mounted on the web portion 18. The positioner member 58 has an opening 60 which is rotatably mounted on a stud 62 extending from the web portion 18. The positioner member 58 also has a lever portion 64 which is used to perform a function in a manner which will be described in greater detail hereinafter.

The positioner member 58 is adapted to engage both the cam member 52 and the switch blade 26 of the first switch 22. Everytime the push button 44 is depressed, the pawl member 48 engages the ratchet member 50 to rotate the ratchet member one increment. Because of the configuration of the cam member 52, upon the rotation of one increment, the positioner member 58 is engaged by the cam member 52 every other increment. When the positioner member 58 is engaged by the cam member 52, the positioner member is moved toward the switch blade 26 to move the switch blade from the off position (FIG. 4) to the on position (FIG. 5). When the positioner member 58 is not engaged by a portion of the cam member 52, the resilient force exerted by the switch blade 26 pivots the positioner member back to the off position shown in FIG. 4.

The second switch 24 has a cam member 68 having a keyed opening 70 to receive the keyed portion 54 therein. The configuration of opening 70 with respect to shaft 54 is such that when the first switch 22 is moved from its off position (FIG. 4) to its on position (FIG. 5) as described above, the cam member 68 of the second switch 24 is moved from its off position (FIG. 6) to its on position (FIG. 7). However, when the first switch 22 is allowed to move from its on position (FIG. 5) to its off position (FIG. 4), there is a loss motion between the cam member 68 so that the second switch 24 remains in the on position as shown in FIG. 7.

As with the first switch 22, a second positioner member 72 is interposed between the cam member 68 and the switch blade 34. The second positioner member 72 is pivotable about point 74 in the same manner as is the first positioner member 58. As cam member 68 is rotated, it will alternately engage and disengage with a portion of the positioner member 72. When the cam member 68 engages the positioner member 72, the second switch 24 assumes its off position as shown in FIG. 6. When the cam member 68 is not engaged with the switch blade 34, the second switch 24 assumes its on position as shown in FIG. 7.

Rather than manually depressing push button 44 after the liquid is fully dispensed into a container outside the percolating apparatus, the bimetallic element 14 is provided to change the first switch from its on position (FIG. 5) to its off position (FIG. 4) automatically. This is accomplished by the interaction of a lock member 78 mounted on the outside of housing 16 and associated between the lever portion 64 of the positioner member 58 and the bimetallic element 14 as is best shown in FIGS. 4, 5, 8 and 9.

The bottom of the lever portion engages a step 82 formed on lock member 78 when the first switch 22 is on. This engagement holds the positioner member 58 in the position shown in FIG. 5. The lever portion 64 also has a boss 80 formed at the end thereof which is adapted to engage the step 82 when the first switch 22 is off as shown in FIG. 4.

Figure 8:
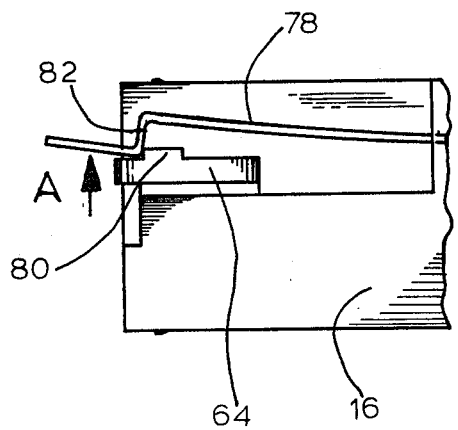
FIG. 8 is a side elevational view taken generally along the line 8—8 of FIG. 4.
Figure 9:
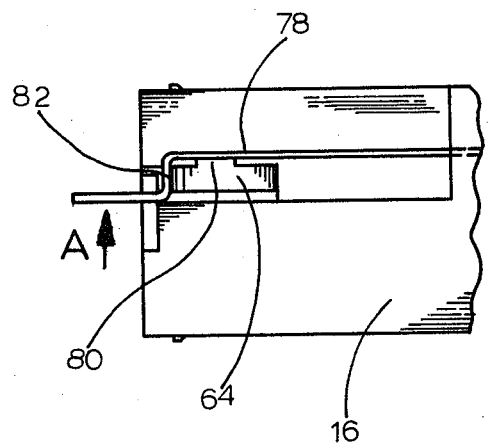
FIG. 9 is a side elevational view taken generally along the line 9—9 of FIG. 5.

The bimetallic element is adapted to move in the direction indicated by arrow A in FIGS. 1, 8 and 9, as the element 14 becomes hotter due to an increase in the temperature of the percolating chamber, wherein the liquid is being heated by the first heating element 12.

When the bimetallic element 14 is thus moved in the direction indicated by arrow A, it engages the bottom of the lock member 78 to move the lock member 78 also in the direction of arrow A allowing the bottom of positioner member 58 to become disengaged with respect to the step 82. When this occurs, the positioner member 58 pivots about stud 62 due to the force of the switch blade 26 against the positioner member 58. When in the off position (FIG. 4), the stop boss 80 engages the step 82 to prevent the positioner member 58 from over-rotating. Upon further rotation of the ratchet member 50, the cam member 52 reengages the positioner member 58 to pivot the positioner member so that the lever portion 64 once again is supported by the step 82.

Figure 3:
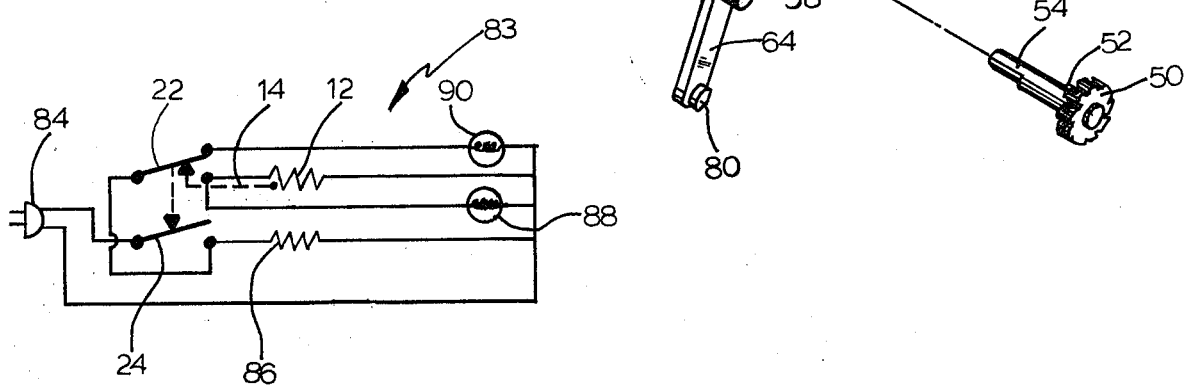
FIG. 3 is a schematic diagram of the electrical circuit of a percolating apparatus employing the switch assembly of the present invention.

Looking at FIG. 3, a typical electrical diagram of a percolating apparatus, generally designated 83, employing the switch assembly 10 of the present invention, is shown. Apparatus 83 is first plugged into a suitable power source at 84. Both the switches 22 and 24 are in their off positions (FIGS. 4 and 6). The apparatus chamber 85 is then filled with liquid. It is to be noted that both the heating element 12 and the bimetallic element 14 are associated with the chamber 85. The second heating element 86 which is in association with the second switch 24 is in close proximity to a container (not shown) outside of the apparatus 83.

Upon the first actuation of the push button 44, the switch assembly 10 assumes its percolating mode. In this mode, both switches 22 and 24 are in their on positions as is shown in FIGS. 5 and 7. Indicator lights 88 and 90 (FIG. 3) can be electrically associated with heating elements 12 and 86 respectively so that a visible indication of the mode of the switch assembly 10 can be observed through light windows 92 mounted in a suitable bezel 94 (FIG. 1).

After chamber 85 assumes a given temperature which is defined when the liquid has been thoroughly percolated and the chamber 85 is substantially empty, the bimetallic element 14 will have moved a sufficient distance to engage and move lock member 78 so that the positioner member 58 allows switch 22 to assume its off position as shown in FIG. 4. However, the change in the position of the first switch 22 does not change the position of the second switch 24 which remains in its on position as shown in FIG. 7 to keep the outside container of liquid warm.

When it is desired to deactivate the entire apparatus 83, the push button 44 is depressed again causing a rotation of shaft 54. The rotation of shaft 54 will not change the position of the first switch 22 so that it will remain in the already off position as shown in FIG. 4. However, this incremental rotation of shaft 54 will cause cam member 68 to engage switch blade 34 to move the second switch 24 to its off position as shown in FIG. 6, thereby defining an off mode for the entire switch assembly 10.

I claim:

1. A switch assembly for use in association with a heating element which heats a medium comprising:
 a housing;
 a first switch mounted in the housing and movable between on and off positions and electrically connected to the heating element to turn the element on and off, said first switch including resilient means tending to keep said second switch in a normally off position and a movable lock member associated between said first switch and thermally responsive actuating means to maintain said resilient means;
 a second switch mounted in the housing movable between on and off positions and mechanically associated with the first switch so that said second switch is movable from its off position to its on position when said first switch is moved from its off position to its on position;
 manually operable actuating means mounted on the housing and associated with said first switch for moving said first switch from it off position to its on position; and
 thermally responsive actuating means associated between said first switch and the medium for moving said first switch from its on position to its off position when the medium reaches a given temperature.

2. The switch assembly of claim 1 including a first light assembly associated with the first switch and a second light assembly associated with the second switch, each light assembly being illuminated when its respective switch is on.

3. The switch assembly of claim 1 wherein said thermally responsive actuating means is a movable bimetallic element mechanically associated with the lock member to hold the first switch in its on position until the bimetallic element moves due to heat.

4. The switch assembly of claim 1 including a second heating element electrically connected to said second switch which turns said second heating element on and off.

5. The switch assembly of claim 1 including a central support member received in the housing dividing the housing into first and second compartments, said first switch being mounted in the first compartment and said second switch being mounted in the second compartment.

6. The switch assembly of claim 1 including coupling means associating said first and second switches, said coupling means causing said first and second switches to move in unison when said first switch is moved from its off position to its on position but provides loss motion when said first switch is moved from its on position to its off position by the thermally responsive actuating means so that said second switch remains on until changed by the manually operable actuating means.

7. An electrical apparatus for receiving a liquid, percolating said liquid and dispensing it into a container outside the apparatus and then maintaining said percolated liquid at a given temperature in the container comprising:
 a percolating chamber for receiving the liquid within the apparatus;
 a first heating element associated with the percolative chamber for percolating the liquid therein;
 a second heating element adjacent the container for heating liquid contained therein; and
 a switch assembly including a housing mounted on the apparatus, a first switch mounted in the housing movable between on and off positions and electrically connected to said first heating element to turn the first heating element on and off, a second switch mounted in the housing movable between on and off positions mechanically associated with the first switch so that the second switch is movable from its off position to its on position when said first switch is moved from its off position to its on position and said second switch being electrically connected to the second heating element to turn said second heating element on and off, manually operable actuating means mounted on the housing and associated with said first switch for moving said first switch from its off position to its on position, and thermally responsive actuating means associated between said first switch and said first heating element for moving said first switch from its on position to its off position when the percolating chamber reaches a given temperature.

8. The apparatus of claim 7 wherein said switch assembly includes a first light assembly associated with the first switch and a second light assembly associated with the second switch, each light assembly being illuminated when its respective switch is on.

9. The apparatus of claim 7, wherein said first switch includes resilient means tending to keep said first switch in a normally off position and a movable lock member associated between said first switch and thermally responsive actuating means.

10. The apparatus of claim 9 wherein the thermally responsive actuating means is a movable bimetallic element mechanically associated with the lock member to hold the first switch in its on position until the bimetallic element moves due to heat.

11. The apparatus of claim 7 wherein the switch assembly includes coupling means associating said first and second switches, said coupling means causing said first and second switches to move in unison when said first switch is moved from its off position to its on position but provides loss motion when said first switch is moved from its on position to its off position by the thermally responsive actuating means so that said second switch remains on until changed by the manually operable actuating means.

* * * * *